Oct. 1, 1957  G. A. REINHARD  2,808,558
MEANS IN COMBINATION WITH AN ALTERNATING CURRENT
GENERATOR FOR ENERGIZING ITS FIELD WINDINGS
Filed Jan. 12, 1955

INVENTOR
Gustav A. Reinhard
BY John Mahoney
ATTORNEY

2,808,558

MEANS IN COMBINATION WITH AN ALTERNATING CURRENT GENERATOR FOR ENERGIZING ITS FIELD WINDINGS

Gustav A. Reinhard, Shaker Heights, Ohio

Application January 12, 1955, Serial No. 481,313

10 Claims. (Cl. 322—27)

The present invention relates to alternating current generators and more particularly to improved means in combination with the generator for controlling the energization of its field windings.

As is now well known, alternating current is extensively utilized in factories, schools, hospitals, and homes for providing illumination, for driving electrically operated machines, for controlling furnaces, and for energizing appliances, such as refrigerators, clocks, and ranges. In cities and most towns, alternating current is supplied through power lines by utility or power companies which are equipped with comparatively large alternating current generators for such purposes. In many localities, however, such as on farms or in small villages, it is necessary to generate power directly and even in cities or towns where electrical power is usually provided, there is always the danger of power failure which frequently make it necessary to close factories and schools. Such power failure also interrupts the supply of electrical energy in homes and hospitals which are more or less dependent upon it for illumination and for energizing the usual household appliances. It is therefore the tendency at the present time, even when power is available, to provide generators which may be operated by suitable means, such as gasoline-driven motors, tractors, or the like, to provide the necessary power in cases of emergency. In cities where power lines are available, such generators are usually adapted to be connected to such lines for supplying the desired power in the event of the failure of power from the usual source until the power from such source is reestablished.

In alternating current generators as now constructed, direct current is required for energizing the field windings which may be provided from an additional source of supply. In alternating current generators, a voltage regulator is also usually provided to maintain the output voltage of the generator at a reasonably constant value under varying load conditions. Such regulators as now constructed, however, adjust the voltage after and not during the change in output.

It is an object of the present invention to provide improved means in combination with an alternating current generator for converting a portion of the alternating current into a pulsating direct current for energizing the field windings which direct current varies with the load upon the generator, thereby varying the flow of current through the field windings to vary the magnetic flux in the poles of the rotor to provide a substantially constant voltage.

Another object of the invention is to provide in combination with an alternating current generator, means including a dry-plate rectifier having a low electrical resistance which is arranged in series with the field windings for providing a pulsating direct current for energizing the field windings and in which a transformer of the high reactance type is provided for providing additional direct pulsating current, the amount of which varies in accordance with the load that is applied to the generator so that the voltage of the generator may be maintained substantially constant irrespective of the load and in which means are provided for short-circuiting that portion of the alternating current induced in the secondary winding of the transformer which would tend to reduce the magnetic flux in the poles of the rotor.

A further object of the invention is to provide in combination with an alternating current generator, means including a dryplate rectifier having a low electrical resistance associated with each of the output conductors of the generator for providing pulsating direct current for energizing the field windings of the generator and in which a transformer of the high reactance type is provided for increasing the amount of pulsating direct current for energizing the field windings in accordance with the load that is applied to the generator so that the voltage of the generator may be maintained substantially constant irrespective of the load and in which means are provided for short circuiting that portion of the alternating current wave that is induced into the secondary winding of the transformer which would tend to reduce the magnetic flux in the poles of the rotor.

My invention will be better understood by reference to the accompanying drawings in which.

The generator may be of the usual type and is provided with a stator and a rotor, and while the drawings show a generator of the revolving field type, it is apparent that it may be of the revolving armature type in which case, the output conductors would be connected to the armature windings through ordinary slip rings. As shown, the stator is stationary and may be provided with windings of the usual type, such as a delta or star winding. The rotor may also be of the usual type and may consist of a pair of poles as shown. Obviously, however, more than one pair of poles may be used.

Figure 1:
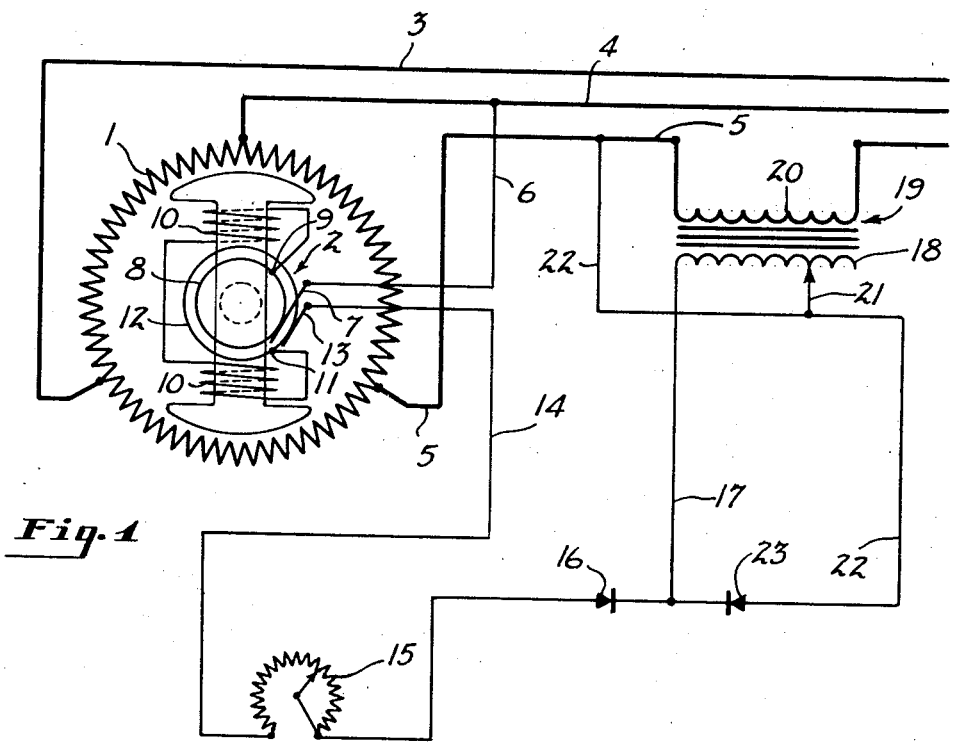
Fig. 1 is a diagrammatic view of one form of my invention.

As illustrated in Fig. 1 of the drawings, an alternating current generator is shown which consists of a stator 1 and a rotor 2 and while the generator may be of the single or multiphase type, as illustrated in the drawings, it is of the delta wound three phase type in which the output conductors 3, 4 and 5 are connected to the stator windings at 120 electrical degrees from each other in the usual manner.

In accordance with the present invention, means are provided for converting a portion of the alternating current generated into a pulsating direct current for energizing the field windings which means is so arranged that the magnetic flux in the poles of the rotor is increased as the load upon the generator is increased so as to maintain a substantially constant voltage irrespective of the load which is applied to the generator. For this purpose, the conductor 4 is electrically connected through suitable means, such as a conductor 6 and a brush 7 to a slip ring 8, to which one terminal 9 of the field winding 10 is also connected. The other terminal 11 of the field windings is connected to a slip ring 12 which is electrically insulated from slip ring 8 and which is provided with a suitable brush 13 arranged in series with a conductor 14, an adjustable rheostat 15, and a rectifier 16, the rectifier being connected by means of a conductor 17 to the secondary winding 18 of a transformer 19, the primary winding 20 of which is in series with the output conductor 5. Slip rings 8 and 12 are mounted upon the rotor in the usual manner. The rectifier 16 is of the dry-plate type, such as a copper-cuprous oxide, a selenium, or a magnesium-copper sulphide rectifier having a comparatively low electrical resistance in the proper direction and the transformer 19 is preferably of the high reactance type.

The secondary winding 18 of the transformer 19 is provided with suitable taps, each of which is adapted to be connected through an adjustable slide 21 and a conductor 22 to conductor 5, or if desired, the secondary winding 18 of the transformer may be electrically connected to conductor 3. Preferably, however, it is connected to conductor 5 at the same terminal to which the primary winding of the transformer 20 is connected. The amount of current from the transformer which is applied to the field windings may therefore be varied.

It will be apparent from the drawings that when the shaft of the rotor of the generator is driven, the residual magnetism in the poles of the rotor causes an alternating current to flow through conductors 3, 4 and 5, and the primary winding 20 of the transformer and that a portion of this current passes from conductor 4 through conductor 6 and slip ring 7 to terminal 9 of the field windings and from the other terminal 11 of the field windings to slip ring 12 and then through brush 13, conductor 14, the adjustable rheostat 15, rectifier 16, and conductor 17 to the secondary winding of the transformer, and from the secondary winding of the transformer through conductor 22 to conductor 5. When the rotor of the generator is driven, residual magnetism in the poles of the rotor is sufficient to provide an alternating current having a low voltage but when the pulsating direct current passes through rheostat 15, rectifier 16, and the secondary winding 18 of the transformer and from one of the taps of the secondary winding through conductor 17 to the conductor 5, the flux in the poles of the rotor is built up to the desired value. The desired voltage at no load may be obtained by adjusting the rheostat 15 and when load is applied to the generator, the magnetic flux in the poles of the rotor is automatically increased by the transformer, thereby maintaining the voltage substantially constant.

While it is not essential to my improved system, to prevent any possible damage to the transformer, conductor 22 also extends beyond the slide 21 and is connected through a second rectifier 23 through conductor 17 to the secondary winding 18 of the transformer to short circuit that portion of the wave of the alternating current formed at the transformer which opposes the portion of the wave which increases the pulsating direct current passing through the field windings. The rectifier 23 may be of the same general type as rectifier 16. It need not, however, be of the low resistance type but preferably has an electrical resistance which is higher than that of rectifier 16.

Figure 2:
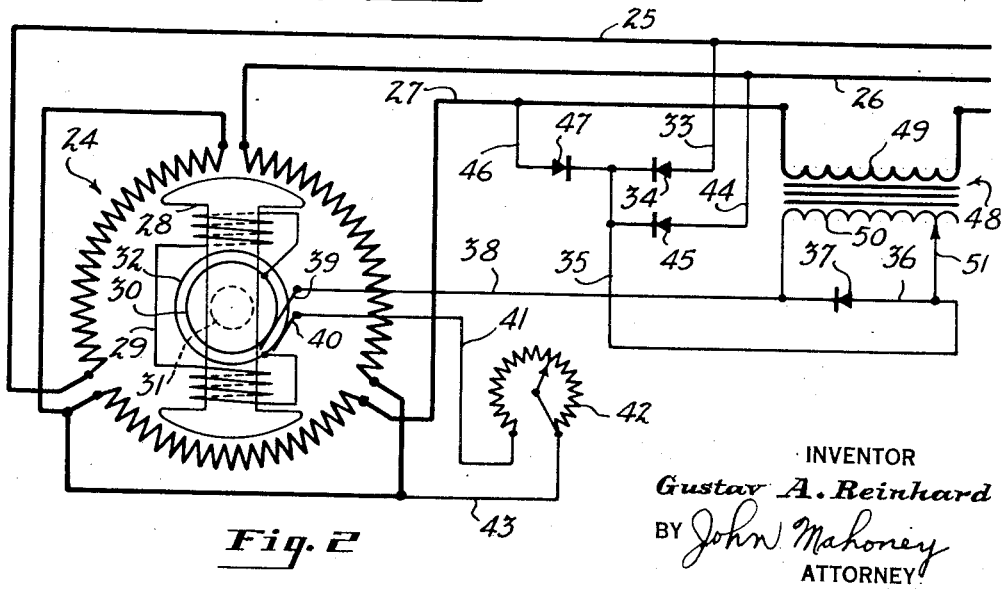
Fig. 2 is a diagrammatic view of another form of my invention.

Another form of my invention is shown diagrammatically in Fig. 2 of the drawings in which the stator winding 24 is of the star type although it may be of the delta wound type as shown in Fig. 1, and the rotor is of the two pole type as shown in Fig. 1 although obviously a rotor having any desirable even number of poles may be employed.

The stator 24 is provided with output conductors 25, 26 and 27 and the rotor 28 is provided with a field winding 29, one terminal of which is connected to a slip ring 30 carried by the rotor shaft 31 and the other terminal of which is connected to a slip ring 32 which is also carried by the rotor shaft and which is electrically insulated from slip ring 30.

In accordance with the invention, means associated with the output conductors are provided for rectifying a portion of the alternating current which is generated for energizing the field windings 29. As shown, a conductor 33 is provided which leads from output conductor 25 to a rectifier 34 of the dry plate type having a comparatively low electrical resistance in the proper direction and from rectifier 34 through conductors 35 and 36 to a second dry-plate rectifier 37 which is also of the low resistance type in the proper direction. The current then flows from rectifier 37 through a conductor 38 to an inlet brush 39 bearing upon slip ring 30 and then through field windings 29 to slip ring 32 from which it is conducted by means of a brush 40 bearing thereon and a conductor 41 to a variable rheostat 42 and from the variable rheostat through conductor 43 and one of the stator windings to conductor 26. A conductor 44 also leads from the output conductor 26 to a rectifier 45 which is of the dry plate type having a low electrical resistance in the proper direction and from rectifier 45 through conductors 35 and 36 and rectifier 37 to brush 39 and from brush 39 through the field winding 29, rheostat 42, conductor 43, and one of the stator windings to conductor 26, and in a like manner, a conductor 46 leads from output conductor 27 through dry plate rectifier 47 which is of the low resistance type in the proper direction and conductors 35, 36, and rectifier 37 to brush 39 and from brush 39 through the field windings, brush 30, adjustable rheostat 42, conductor 43, and one of the stator windings to conductor 26. It will be noted that in accordance with the system shown in Fig. 2, a portion of the alternating current generated in each output conductor is rectified, thereby providing a more balanced system than that shown in Fig. 1. On the other hand, more rectifiers are necessary which increases the cost. It is therefore desirable to provide the system shown in Fig. 1 for small generators whereas the system shown in Fig. 2 is more desirable for larger generators. In the system shown in Fig. 2, the voltage at no load may be regulated by adjusting the rheostat 42.

Means are also provided in the system shown in Fig. 2 for providing a substantially constant voltage when a load is applied to the generator. For this purpose, a transformer 48 is provided, the primary winding 49 of which is in series with one of the output conductors. As shown, it is connected in series with the output conductor 27 and the secondary winding 50 of the transformer is provided with taps and one end portion is connected through an adjustable slide 51 to conductor 36 and the other terminal is connected to conductor 38 so that when a load is applied to the generator, one-half of the wave of the alternating current that is induced in the secondary winding will flow through conductor 38 to brush 39 and the field windings 29 and the other half of the alternating current wave induced in the secondary winding will be short-circuited by rectifier 37.

What is claimed is:

1. In combination, an alternating current generator having a stator provided with a plurality of spaced conductors leading therefrom and a rotor provided with an even number of poles, a field winding having first and second terminals for said rotor, a transformer of the high reactance type, the primary winding of which is in series with one of the output conductors leading from said stator, means for electrically connecting a second output conductor leading from said stator to the first terminal of the field windings, a dry plate rectifier having a low electrical resistance connected in series with the second terminal of the field windings and the secondary winding of said transformer, and means for electrically connecting the secondary winding of the transformer to an output conductor leading from said stator which is different from that to which the first terminal of the field winding is connected to thereby vary the amount of pulsating direct current that is passed through the field windings in accordance with the load that is applied to the generator.

2. In combination, an alternating current generator having a stator provided with a plurality of spaced output conductors leading therefrom and a rotor provided with an even number of poles, a field winding for said rotor having a terminal at each end, a transformer of the high reactance type, the primary winding of which is in series with one of the output conductors leading from said stator, means for electrically connecting a second output conductor leading from said stator to one terminal of the field winding, a rectifier electrically connected in series with the other terminal of the field winding and the secondary winding of said transformer, means for electrically connecting the secondary winding of the transformer to an output conductor leading from said stator which is different from that to which the first terminal of the field winding is connected to thereby vary the amount of pulsating direct current which is passed through the field winding in accordance with the load that is applied to the generator, and a variable rheostat arranged in series with said rectifier and the secondary winding of said transformer to adjust the output voltage of said generator to a definite value under no load conditions.

3. In combination, an alternating current generator having a stator provided with a plurality of spaced output conductors leading therefrom and a rotor provided with an even number of poles, a field winding for said rotor having first and second terminals, a transformer of the high reactance type, the primary winding of which is in series with one of said output conductors, means for electrically connecting a second output conductor leading from said stator to the first terminal of said field winding, a dry plate rectifier having a low electrical resistance connected in series with the second terminal of the field windings and the secondary winding of said transformer, and the secondary winding of said transformer being provided with a plurality of taps, a conductor provided with a slide for electrically connecting the secondary winding of said transformer at a selected tap to an output conductor leading from said stator which is different from that to which the first terminal of the field winding is connected to thereby vary the amount of pulsating direct current that is passed through the field winding in accordance with the load that is applied to the generator, and said slide being adjustable to engage any desired tap on the secondary winding of the transformer to vary the amount of current from the secondary winding of said transformer which is applied to the field circuit when the rotor of said generator is driven.

4. In combination, an alternating current generator having a stator provided with a plurality of spaced output conductors leading therefrom and a rotor provided with an even number of poles, a field winding for said rotor having first and second terminals, a transformer of the high reactance type, the primary winding of which is in series with one of said output conductors, means for electrically connecting a second output conductor leading from said stator to the first terminal of said field winding, a dry plate rectifier of the low resistance type connected in series with the second terminal of the field winding and the secondary winding of said transformer, a conductor leading from the secondary winding of the transformer to an output conductor leading from said stator which is different from that to which the first terminal of the field winding is connected to thereby vary the amount of pulsating direct current which is passed through the field winding in accordance with the load that is applied to the generator, and a second rectifier arranged to short-circuit that portion of the alternating current waves which are produced at the transformer which would tend to decrease the magnetic flux in the poles of the rotor.

5. In combination, an alternating current generator having a stator provided with a plurality of spaced output conductors leading therefrom and a rotor provided with an even number of poles, a field winding for said rotor having first and second terminals, a transformer of the high reactance type, the primary winding of which is in series with one of said output conductors and the secondary winding of which is provided with a plurality of taps, means for electrically connecting an output conductor leading from said stator to the first terminal of said field winding, a dry plate rectifier of the low resistance type electrically connected in series with the second terminal of the field winding and the secondary winding of said transformer, a conductor provided with a slide for electrically connecting the secondary winding of said transformer at any one of said taps to an output conductor leading from said stator which is different from that to which the first terminal of the field winding is connected to thereby vary the amount of pulsating direct current that is passed through the field winding in accordance with the load that is applied to the generator, a variable rheostat arranged in series with said rectifier to adjust the voltage of said generator under no load conditions, and a second rectifier arranged to short circuit that portion of the pulsating current waves which is produced at the transformer which would tend to decrease the magnetic flux in the poles of the rotor.

6. In combination, an alternating current generator having a stator provided with a plurality of spaced output conductors and a rotor having an even number of poles, a field winding having first and second terminals for energizing the poles of the rotor, a dry plate rectifier of the low resistance type, means for providing an electrical connection between one of the output conductors of said generator and the first terminal of the field winding, means for providing a second electrical connection between the second terminal of the field winding and a second output conductor, said rectifier being in series with one of said electrical connections and being so arranged that alternating current from one of said output conductors will be rectified into a pulsating direct current for energizing said field windings, and means for increasing the flow of pulsating direct current through the field winding of said rotor in accordance with the load that is applied to said generator, said means including a transformer of the high reactance type, the primary winding of which is connected in series with one of said output conductors and one portion of the secondary winding of which is connected to one of said output conductors and a second portion of which is electrically connected to one of the terminals of the field winding, and said secondary winding and said rectifier being so arranged that only one-half of the wave of the alternating current induced in the secondary winding of the transformer will pass to the field winding.

7. The combination as defined in claim 6 in which a second dry plate rectifier is arranged in series with a portion of the secondary winding of said transformer to short circuit that portion of the alternating current wave that is induced into the secondary winding of the transformer which would oppose the magnetization of said rotor.

8. The combination as defined in claim 6 in which an adjustable rheostat is arranged in series with the field winding for adjusting the voltage at no load.

9. In combination, an alternating current generator having a stator provided with a plurality of spaced output conductors and a rotor having an even number of poles, a field winding having first and second terminals for energizing the poles of the rotor, means for electrically connecting one of the terminals of the field winding to one of said output conductors, an electrical connection between each of said output conductors and the second terminal of the field winding having a dry-plate rectifier of the low resistance type therein for converting a portion of the alternating current generated into a pulsating direct current for energizing said field winding under no load conditions when said rotor is driven, and means for increasing the energization of said field winding when a load is applied to said generator including a transformer of the high reactance type, the primary winding of which is in series with one of said output conductors and the secondary winding of which is parallel with the electrical connection leading to the second terminal of the field winding, and a dry plate rectifier electrically connected across the terminals of the secondary winding of said transformer for short-circuiting that half of the wave of the alternating current which is induced into the secondary winding of said transformer which would tend to oppose the energization of the field winding.

10. The combination as defined in claim 6 in which an electrical connection is provided between each of the output conductors and the first terminal of the field windings, each of which connections has a dry plate rectifier of the low resistance type in series therewith for converting a portion of the alternating current into a pulsating direct current for energizing the field windings under no load conditions and in which the secondary winding of the transformer is parallel to the electrical connections leading to the first terminal of the field windings and in which a dry plate rectifier is electrically connected across the terminals of the secondary winding of the transformer for short circuiting that half of the waves of the alternating current that is induced in the secondary winding of the transformer which would oppose the energization of the field windings.

References Cited in the file of this patent
FOREIGN PATENTS 746,047     France _____ May 20, 1933